United States Patent Office 3,259,600
Patented July 5, 1966

3,259,600
STABLE AQUEOUS SOLUTIONS OF METAL CO-ORDINATION COMPLEXES OF CATIONIC THERMOSETTING POLYAMIDO-POLYAMINE-EPICHLOROHYDRIN WET STRENGTH RESINS
Anthony Thomas Coscia, South Norwalk, and Laurence Lyman Williams, Stamford, Conn., assignors to American Cyanamid Company, Stamford, Conn., a corporation of Maine
No Drawing. Filed Sept. 9, 1965, Ser. No. 486,234
16 Claims. (Cl. 260—29.2)

This is a continuation-in-part of our copending application, Serial No. 283,690, filed on May 28, 1963, and now abandoned.

The present invention relates to aqueous solutions of a water-soluble cationic thermosetting polyamidopolyamine-epichlorohydrin wet-strength polymer of improved stability against gelation on storage, and methods for the manufacture of such solutions.

There have recently been disclosed in the patent literature a group of wet-strength polymers for paper which are highly efficient when employed as beater additives at an alkaline pH. These polymers are prepared by reacting at a temperature between about 110° C. and 250° C. a saturated aliphatic dibasic carboxylic acid with a polyalkylene-polyamine to form a water-soluble linear polyamidopolyamine containing preferably at least one secondary amino group per repeating unit of the polymer, followed by reacting the polyamidopolyamine with from about 0.5 to about 1.8 or 2 mols of epichlorohydrin per secondary amino group present to form a cationic water-soluble thermosetting polymer.

These polymers are generally termed "polyamidopolyamine-epichlorohydrin polymers," and are described in U.S. Patents Nos. 2,926,116; 2,926,154; 3,039,889; 3,058,-873; 3,086,961; and 3,197,427. They thermoset very rapidly at low temperature, and while they can be stabilized by addition of quaternizing compounds and strong acids, up to the present they have been generally regarded as inherently storage-unstable.

For this reason, it has been customary to avoid holding these polymers at concentrations higher than about 20% resin solids by weight, and to store and ship these polymers as dilute (e.g. 10%) aqueous solutions. At a resin concentration of 20%, gelation generally occurs within two to four months and sometimes within a few hours, depending chiefly on the amount of epichlorohydrin in the polymer and the extent to which this epichlorohydrin has been reacted.

The discovery has now been made that metal co-ordination complexes of these polymers are comparatively stable when the electron charge density of the complexing metal is greater than that of sodium, and it has further been found that these complexes are substantially as efficient for wet-strength purposes (even after storage at solids content higher than 20% by weight for many months) as the respective parent polymers.

The present invention thus permits the polymer solutions to be shipped over longer distances and stored at higher solids content than had heretofore been deemed possible.

The complexes of the present invention in general are formed by adding a metal complexing salt to an aqueous solution of the water-soluble cationic thermosetting polyamidopolyamine-epichlorohydrin wet-strength polymer. The complex forms spontaneously (sometimes with evolution of heat).

The reaction is most conveniently performed at room temperature with the resin solution at fluid viscosity to permit easy distribution of the complexing salt. Under these conditions the complexing salt dissolves readily and uniformly in the solution.

Thereafter the polymer solution may be vacuum-concentrated to the desired solids content. The polymer complex, in preferred embodiments, meets all commercial requirements as to stability when concentrated to 25% polymer solids by weight, and its stability is generally satisfactory, also in preferred embodiments, at solids contents at least up to 35% by weight.

The pH of the solution during storage may be neutral or acid. A pH between about 3 and 5 has given excellent results and is therefore preferred.

If preferred, the complexing salt may be added during manufacture of the polymer. In that event, the dibasic acid is reacted in substantially anhydrous state with the polyalkylenepolyamine thereby forming the water-soluble cationic linear polyamidopolyamine, after which the polyamidopolyamine is reacted in aqueous solution with epichlorohydrin or other cross-linking agent to form a thermosetting wet-strength polymer for paper. The complexing salt can be added to the reaction mixture along with the epichlorohydrin, so that the epichlorohydrin reaction takes place in the presence of a metal salt complexing agent for the polyamidopolyamine.

The co-ordination complexes of the present invention are believed to be compositions the molecular structure of which contains one or more metal atoms which are bonded to nitrogen atoms of the polymer by co-ordinate covalent bonds. These bonds are evidently weak and the complex evidently dissociates when in dilute aqueous solution such as papermaking fibrous suspensions.

The formula of these complexes has not been ascertained and applicants do not wish to be bound by any theory. However, the evidence to date is that they are metal co-ordination complexes such as are disclosed in "Encyclopedia of Chemical Technology" by Kirk and Othmer, vol. 4, page 379 (New York, N.Y. 1949).

The electron charge densities of complexing metals are the electrostatic charges of the metals divided by their respective radii, as shown at pages 191–202 of the book, "Chemistry of the Metal Chelate Compounds" by A. E. Martell and M. Calvin (New York, 1952). The electron charge densities of sodium and potassium are respectively 1.05 and 0.75. The electrostatic charge in each instance is equal to the valence of the metal in the state in which it is present in the salt. Thus the electrostatic charge of iron is 2 or 3, depending on whether it is present in ferrous or ferric state.

Among cations, longest stability has been achieved when the complexing metal is zinc and aluminum. A major improvement in stability has been effected when the complexing metal is calcium, chromium, iron, magnesium and lithium. Because of their cheapness and the satisfactory stability which they impart, the alkali earth metal cations are preferred.

The wet-strength obtained by use of complexes containing calcium and magnesium is somewhat higher than the wet strength obtained by use of the complexes of these polymers with other common metals. The magnesium and calcium complexes of these polymers are therefore preferred.

In general, the amount of complexing agent which is added to the polyamidopolyamine-epichlorohydrin polymer solution depends upon the amount of stability which it is desired to impart. This varies with the particular salt employed and the particular polymer treated, but in each instance can be readily determined by laboratory trial.

The metals may be added in the form of their nitrates, sulfates, chlorides and bromides.

The invention is not applicable to aqueous solutions ontaining less than 10% by weight of the polymer. At these low concentrations the polymer is almost indefinitely stable, and is therefore negligibly or not at all benefitted by the present invention.

Our evidence is that it is preferable to add sufficient of the complexing salt (or an equivalent amount of corresponding base and acid) so that the total amount of complexing metal which is present is in excess of the stoichiometric complexing capacity of the polymer for the metal. This means that the number of co-ordinating valences of the metal cation should be in excess of the groups of the polymer which are capable of complexing. Optimum results are generally obtained when the complexing salt is present in stoichiometric excess so as to force the complexing reaction to the right. For this purpose the weight of the complexing metal should be 10% to 50% or more of the weight of the polymer.

The co-ordination polymer complexes of the present invention are used in the manufacture of paper, in the same manner and in the same amount in which their parent polymers have heretofore been used in the past. Results are substantially the same.

The invention is further illustrated by the examples which follow. These examples are specific embodiments of the invention and are not to be construed as limitations thereof.

Example 1

The following illustrates the preparation of an aqueous acidic solution of a metal co-ordination complex of a water-soluble, cationic thermosetting polyamidopolyamine-epichlorohydrin wet-strength polymer, and shows the effectiveness of the complex for wet-strength purposes in comparison with the effectiveness for this purpose of the parent polymer.

The starting material employed is a polyamidopolyamine-epichlorohydrin polymer (prepared by reacting adipic acid and diethylenetriamine in 1:1 molar ratio). This is diluted to 30% solids with water and is reacted with 1.2 mols of epichlorohydrin until a cationic thermosetting wet-strength polymer develops, as is shown in Keim U.S. Patent No. 2,926,154. The polymer solids content of this product is adjusted to 28% by weight by addition of water and the pH is adjusted to 4.6 by addition of concentrated HCl. The temperature of the solution is about 20° C. and its viscosity is J on the Gardner-Holdt scale at 25° C.

Four aliquots of the solution are taken (each containing 100 g. of resin) and to each is added anhydrous coarsely crystalline calcium chloride in amounts respectively shown in the table below. The solutions are stirred; heat is evolved; the viscosity increases; and cooling is applied to minimize the temperature rise. The solutions are then vacuum-concentrated to remove an amount of water equal to the weight of calcium chloride added, at which point the resin content of the solutions is 28% by weight.

The comparative stability of the solutions is determined by storage of samples at 70° F. along with a sample of the polymer solution which contains no calcium chloride as control. The samples are observed periodically for gelation. Results are as follows:

| No. | Percent CaCl₂ Added [1] | Time to Gel at 70° F. |
|---|---|---|
| 1 | None | 17 days. |
| 2 | 50 | >7 months. |
| 3 | 75 | >7 months. |
| 4 | 100 | >7 months. |

[1] Based on resin content of the solution.

Samples 2–4 (containing calcium chloride) decrease in viscosity on storage.

Example 2

The comparative effectiveness of the metal complexed polymer of the present invention as wet-strength agent for paper is determined by forming an aqueous suspension of bleached northern kraft pulp at a consistency of 0.6% and a pH of 7, adding 1% of the polymer (polymer solids based on the dry weight of the fibers), sheeting the pulp to form handsheets having a basis weight of 50 lb. per 25" x 40"/500 ream, drying the handsheets for one minute at 240° F., and determining the wet-strength of the resulting paper.

The procedure is repeated after 100% of calcium chloride has been added to the polymer and the polymer has aged 7 months at room temperature.

The wet tensile strength of both samples of paper is 6.8 lb./inch.

Example 3

The procedure of Example 1 is repeated to show the comparative effect as stabilizing agents of a number of metal co-ordination complexing agents.

| No. | Complexing Salt | | | Percent Metal [3] | Time to Gel at 70° F. [4] | Wet Strength Efficiency of Polymer Complex | |
|---|---|---|---|---|---|---|---|
| | Name | ECD [1] | Percent Added [2] | | | Time Stored | Lb./inch |
| 1 | None | | (Control) | | 4 days | | [5] [6.9] |
| 2 | CaCl₂ | 1.7 | 100 | 36 | >7 mo. | 7 mo. | 7.0 |
| 3 | MgCl₂ | 2.44 | 100 | 25 | >7 mo. | 4 wks. | 6.8 |
| 4 | ZnCl₂ | 2.27 | 100 | 48 | >7 mo. | 5 wks. | 5.9 |
| 5 | AlCl₃ | 4.17 | 100 | 20 | >7 mo. | 4 wks. | 6.2 |
| 6 | CrCl₃ | 3.76 | 100 | 33 | >1 mo. | | |
| 7 | FeCl₃ | 2 | 100 | 44 | >1 mo. | | |
| 8 | LiCl | 1.69 | 100 | 17 | >6 mo. | 3 wks. | 6.8 |

[1] Electron charge density of metal in salt.
[2] Based on weight of the resin.
[3] Weight of metal in complexing salt based on weight of the polymer.
[4] Products of runs 2–8 were ungelled at time of writing.
[5] Contains no metal.

In general, good results are obtained when the weight of the metal in the complexing salt (or salts) is between 10% and 50% of the weight of the resin.

Example 4

The following illustrates the stabilizing action of the complex metal at neutral pH.

The polyamidopolyamine-epichlorohydrin resin employed as raw material for Example 1 is adjusted to 30% solids and the pH is adjusted to 7. The sample is divided in half. One part is left untreated as control. To the other is added 100% of calcium chloride based on the weight of the polymer therein, and water is removed by vacuum evaporation equal to the weight of calcium chloride added, so that the polymer content of the solution is 30% by weight.

The control solution gels after four days at room temperature. The test solution is stable after 8 days.

Example 5

The following illustrates the manufacture of a polyamidopolyamine-epichlorohydrin metal polymer complex wherein the epichlorohydrin is reacted in the presence of the metallizing salt. Parts are by weight unless otherwise stated.

Adipic acid and diethylenetriamine are reacted in 1:1 molar ratio at 165° C. until a polymer is formed which has a viscosity of 300 cp. as a 50% aqueous solution. One part of the polymer is dissolved in three parts of warm water and ¼ part of powdered calcium chloride is slowly dissolved therein. The solution is then reacted with 1.2 mol of epichlorohydrin per mol of combined diethylenetriamine at about 50° C. until a 30% by weight solution of the resulting polymer has a viscosity of 200 cp. There is then added ¾ part of calcium chloride. The solution is stirred with cooling until the calcium chloride has dissolved.

The solution is then vacuum-concentrated in excess of 30% solids by weight (to 33% solids) and is acidified to pH 4 with HCl. It is stable at 70° F. for over four months.

We claim:

1. An aqueous solution of a metal coordination complex of a water-soluble cationic thermosetting polyamidopolyamine-epichlorohydrin wet-strength polymer, the weight of said polymer being more than 10% of the weight of said solution, the metal of said complex having a charge density greater than that of sodium.

2. A solution according to claim 1 having a pH between 4 and 6.

3. An aqueous acidic solution of a metal coordination complex of a water-soluble cationic thermosetting polyamidopolyamine-epichlorohydrin wet-strength polymer, the weight of metal in said solution being between 10% and 50% of the weight of said polymer, the metal of said complex having a charge density greater than that of sodium.

4. An aqueous acidic solution of an alkali earth metal coordination complex of a water-soluble cationic thermosetting polyamidopolyamine-epichlorohydrin wet-strength polymer, the weight of said polymer being more than 10% of the weight of said solution.

5. An aqueous acidic solution of a magnesium coordination complex of a water-soluble cationic thermosetting polyamidopolyamine-epichlorohydrin wet-strength polymer, the weight of said polymer being more than 10% of the weight of said solution.

6. An aqueous acidic solution of a calcium coordination complex of a water-soluble cationic thermosetting polyamidopolyamine-epichlorohydrin wet-strength polymer, the weight of said polymer being more than 10% of the weight of said solution.

7. An aqueous acidic solution of a zinc coordination complex of a water-soluble cationic thermosetting polyamidopolyamine-epichlorohydrin wet-strength polymer, the weight of said polymer being more than 10% of the weight of said solution.

8. An aqueous acidic solution of an aluminum coordination complex of a water-soluble cationic thermosetting polyamidopolyamine-epichlorohydrin wet-strength polymer, the weight of said polymer being more than 10% of the weight of said solution.

9. A solution according to claim 1 wherein the weight of the polymer is in excess of 30% thereof.

10. An aqueous acidic solution of a metal complex of a water-soluble cationic thermosetting adipic acid-diethylenetriamine-epichlorohydrin wet-strength polymer, the weight of said polymer being more than 10% of the weight of said solution, the metal of said complex having a charge density greater than that of sodium.

11. An aqueous acidic solution of a calcium complex of a water-soluble cationic thermosetting adipic acid-diethylenetriamine-epichlorohydrin wet-strength polymer, the weight of said polymer being more than 10% of the weight of said solution.

12. A process of stabilizing against gelation an aqueous solution containing more than 10% by weight of a water-soluble cationic thermosetting polyamidopolyamine-epichlorohydrin wet-strength polymer, which comprises forming a metal coordination complex of said polymer, and acidifying the solution, the metal of said complex having a charge density greater than that of sodium.

13. A process according to claim 12 wherein said polymer is substantially completely formed into the coordination complex.

14. A process of forming a high-solids solution of improved storage stability of a water-soluble cationic thermosetting polyamidopolyamine-epichlorohydrin wet-strength polymer, which comprises forming a 25% to 40% by weight aqueous acid solution of said polymer and complexing said polymer with a metal in said solution, the metal of said complex having a charge density greater than that of sodium.

15. A process according to claim 14 wherein the solution is vacuum concentrated after the polymer has complexed with the metal.

16. In the manufacture of a high-solids solution of a water-soluble cationic thermosetting polyamidopolyamine-epichlorohydrin wet-strength polymer, wherein a lower water-soluble dibasic acid is reacted in anhydrous state with a polyalkylenepolyamine thereby forming a water-soluble cationic linear polyamidopolyamine and said polyamidopolyamine is reacted in aqueous solution with epichlorohydrin to form a thermosetting wet-strength polymer for paper, the improvement which consists in reacting said polyamidopolyamine with said epichlorohydrin in aqueous solution in the presence of a dissolved amount of a metal complexing agent for said polyamidopolyamine, the metal of said complex having a charge density greater than that of sodium.

References Cited by the Examiner

UNITED STATES PATENTS 2,422,666  6/1947  Fuller _____ 260—78
2,926,154  2/1960  Keim _____ 260—78

MURRAY TILLMAN, *Primary Examiner.*

J. C. BLEUTGE, *Assistant Examiner.*